(12) United States Patent
Park et al.

(10) Patent No.: US 12,705,466 B2
(45) Date of Patent: Aug. 11, 2026

(54) NEUROMORPHIC DEVICE FOR PARALLEL PROCESSING OF SPIKE SIGNALS

(71) Applicant: SEOUL NATIONAL UNIVERSITY R&DB FOUNDATION, Seoul (KR)

(72) Inventors: Byung-Gook Park, Seoul (KR); Munhyeon Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 962 days.

(21) Appl. No.: 17/972,046

(22) Filed: Oct. 24, 2022

(65) Prior Publication Data

US 2023/0153588 A1 May 18, 2023

Related U.S. Application Data

(63) Continuation of application No. PCT/KR2022/013071, filed on Sep. 1, 2022.

(30) Foreign Application Priority Data

Nov. 18, 2021 (KR) ........................ 10-2021-0159710
Jun. 14, 2022 (KR) ........................ 10-2022-0071885

(51) Int. Cl.
*G06N 3/049* (2023.01)
*G06F 7/544* (2006.01)
(Continued)

(52) U.S. Cl.
CPC ........... *G06N 3/049* (2013.01); *G06F 7/5443* (2013.01); *G06G 7/161* (2013.01); *G06N 3/065* (2023.01); *G06F 2207/4824* (2013.01)

(58) Field of Classification Search
CPC .. G06N 3/04; G06N 3/049; G06N 3/06–0675; G11C 11/54; G06F 7/5443;
(Continued)

(56) References Cited

U.S. PATENT DOCUMENTS 9,082,079 B1 7/2015 Coenen
2021/0133541 A1* 5/2021 Vasanthakumaribabu ................. G11C 13/0028

(Continued)

FOREIGN PATENT DOCUMENTS

JP 2001229678 A 8/2001
KR 20130013013 2/2013

(Continued)

*Primary Examiner* — Matthew D Sandifer
(74) *Attorney, Agent, or Firm* — CANTOR COLBURN LLP

(57) ABSTRACT

A neuromorphic device comprises a synaptic array including a plurality of word lines and bit lines and including a plurality of synaptic elements coupled to intersections of each of the word lines and the bit lines, a word line signal output unit that sequentially outputs a plurality of word line signals for activating the word lines, a signal pre-processing unit that preprocesses a spike signal to modulates the spike signal into an input signal, a weight summation unit including a plurality of weight summation circuits that respectively output a plurality of output signals obtained by applying respective weighted values stored in the synaptic array to a plurality of input signals input through the signal pre-processing unit, and a data output unit that transmits the output signals output by the weight summation unit respectively to a plurality of output neurons in response to the word line signal.

11 Claims, 3 Drawing Sheets

(51) Int. Cl.
*G06G 7/161* (2006.01)
*G06N 3/065* (2023.01)

(58) Field of Classification Search
CPC ............ G06F 17/16; G06F 2207/4824; G06G 7/16–161
See application file for complete search history.

(56) References Cited

U.S. PATENT DOCUMENTS

| | | | | |
|---|---|---|---|---|
| 2021/0166108 | A1* | 6/2021 | Lee | G06N 3/04 |
| 2021/0319293 | A1* | 10/2021 | Lee | G06N 3/063 |
| 2022/0156549 | A1* | 5/2022 | Yudanov | G06N 3/0495 |
| 2022/0270675 | A1* | 8/2022 | Kim | G11C 11/54 |
| 2023/0215498 | A1* | 7/2023 | Song | G11C 7/1006<br>365/191 |

FOREIGN PATENT DOCUMENTS

| | | | |
|---|---|---|---|
| KR | 20170080440 | | 7/2017 |
| KR | 20180050830 | | 5/2018 |
| KR | 20190051766 | | 5/2019 |
| KR | 20200088952 | A | 7/2020 |
| KR | 20200132444 | A | 11/2020 |
| KR | 20210004343 | | 1/2021 |
| KR | 20210004344 | | 1/2021 |
| KR | 20210004347 | | 1/2021 |
| KR | 20210064767 | | 6/2021 |
| KR | 20210070590 | A | 6/2021 |
| KR | 20210077159 | A | 6/2021 |

* cited by examiner

FIG. 3

SYNAPTIC ARRAY(130)
WEIGHT SUMMATION UNIT(140)
DATA OUTPUT UNIT(150)
WL [M:1]
$X_1$ [N:1]
$X_2$ [N:1]
$X_k$ [N:1]
145
146
147

NEUROMORPHIC DEVICE FOR PARALLEL PROCESSING OF SPIKE SIGNALS

TECHNICAL FIELD

The present invention relates to a neuromorphic device for parallel processing of spike signals.

BACKGROUND

Recently, along with the development of a computing technology based on artificial neural networks, research and development of hardware-based neural networks have been actively conducted.

Neural networks, which are currently being widely studied, started from imitation (concepts for memory, learning, and inference) of an actual biological nervous system, but only a similar network structure is adopted, and there is a difference from a nervous system in various aspects, such as a signal transmission and information expression method and a learning method.

Meanwhile, in relation to a hardware-based spiking neural network (SNN) which operate almost identically to the real nervous system, a learning method that outperforms existing neural networks has not yet been developed, and thus, the SNN is rarely used in the real industry. However, when a synaptic weight is derived by using the existing neural network and inference is performed by using the synaptic weight through an SNN method, a high-accuracy and ultra-low-power computing system may be implemented, and thus, research thereon is being actively conducted.

The SNN consists of a synaptic array that stores weighted values and a neuronal circuit that is responsible for activation. In addition, the SNN transforms an input size of a network by using coding using a concept of time, and inputs of the same size are simultaneously input depending on coding methods. The synaptic array converts the simultaneous inputs into currents corresponding to the weighted values stored in each synaptic element, and currents of the synaptic elements connected to the same output neuron have to be summed up again in the synaptic array.

As research advances on the known hardware-based machine learning and in-memory computing, complexity of the SNN is also increasing, and a corresponding large amount of synaptic array is required to process a huge amount of information. Accordingly, complexity of a system inevitably increases and energy efficiency decreases, and thus, a solution therefor is required.

SUMMARY OF INVENTION

Technical Problem

The present invention is to solve the problems described above, and an object of the present invention is to provide a neuromorphic device capable of processing a plurality of input signals in parallel.

However, a technical object to be solved by the present embodiment is not limited to the technical object described above, and there may be other technical objects.

Solution to Problem

As a technical means for solving the above technical problems, a neuromorphic device according to an aspect of the present invention includes a synaptic array including a plurality of word lines and a plurality of bit lines and including a plurality of synaptic elements coupled to intersections of each of the plurality of word lines and each of the plurality of bit lines, a word line signal output unit that sequentially outputs a plurality of word line signals for activating the plurality of word lines, a signal pre-processing unit that preprocesses a spike signal to modulates the spike signal into an input signal including a plurality of pulses, a weight summation unit including a plurality of weight summation circuits that respectively output a plurality of output signals obtained by applying respective weighted values stored in the synaptic array to a plurality of input signals input through the signal pre-processing unit, and a data output unit that transmits the plurality of output signals output by the weight summation unit respectively to a plurality of output neurons in response to the plurality of word line signal.

In addition, a neuromorphic device according to another aspect of the present invention includes a synaptic array including M word lines (M is a natural number) and N bit lines (N is a natural number) and including a plurality of synaptic elements coupled to intersections of each of the plurality of word lines and each of the plurality of bit lines, a weight summation unit including K weight summation circuits that output respectively output signals obtained by applying respective weighted values stored in the synaptic array to K input signals, and a data output unit that transmits the K output signals output from the weight summation unit respectively to output neurons for each pulse in response to M word line signals for sequentially activating the plurality of word lines, wherein each of the K input signals includes N pulses.

Advantageous Effects

According to the above-described problem solving means of the present application, a system capable of parallel processing a plurality of input signals may be constructed with respect to an SNN-based neuromorphic device. That is, an inference operation for the plurality of input signals may be performed in parallel by using a learning model stored in one synaptic array, and thus, a processing speed may be greatly improved.

In addition, since only one synaptic array is used, energy consumption may be reduced, and a low-power environment may be implemented.

BRIEF DESCRIPTION OF THE DRAWINGS

FIG. 3 is a circuit diagram illustrating a detailed configuration of a neuromorphic device according to an embodiment of the present invention.

BEST MODE FOR INVENTION

Figure 1:
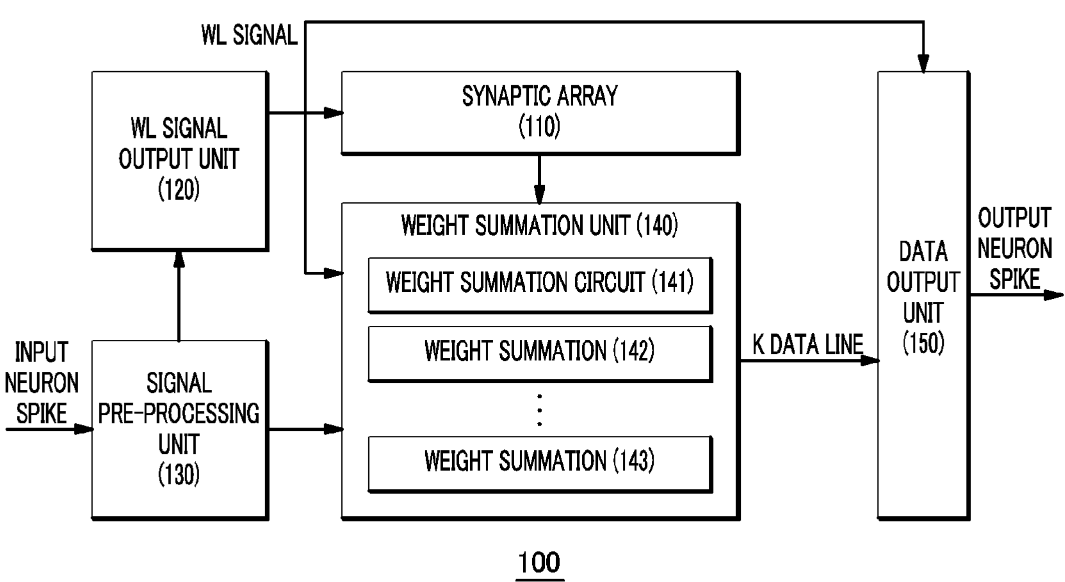
FIG. 1 is a block diagram illustrating a configuration of a neuromorphic device according to an embodiment of the present invention.

Hereinafter, embodiments of the present invention will be described in detail with reference to the accompanying drawings such that those skilled in the art may easily carry out the present invention. However, the present invention may be embodied in various different forms and is not limited to the embodiments described herein. In addition, in order to clearly illustrate the present invention in the drawings, parts irrelevant to the descriptions are omitted, and similar reference numerals are attached to similar parts throughout the specification.

Throughout the specification, when a portion is "connected" to another portion, this includes not only a case of being "directly connected" but also a case of being "electrically connected" with another component therebetween.

Throughout the specification, when a member is said to be located "on" another member, this includes not only a case in which a member is in contact with another member but also a case in which another member is present between the two members.

A neuromorphic device of the present invention is manufactured to imitate a human brain in hardware by using a semiconductor process, and includes a synaptic element corresponding to a synapse of the brain, a neuron circuit corresponding to a neuron, and various peripheral circuits.

Hereinafter, embodiments of the present invention will be described in detail with reference to the accompanying drawings.

Figure 2:
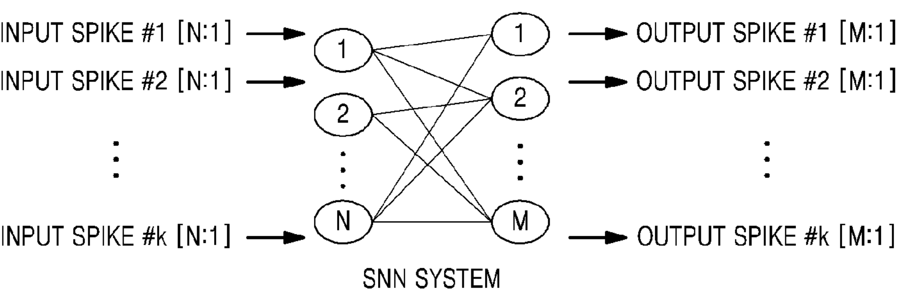
FIG. 2 is a conceptual diagram illustrating a configuration of an SNN provided by a neuromorphic device, according to an embodiment of the present invention.
Figure 3:
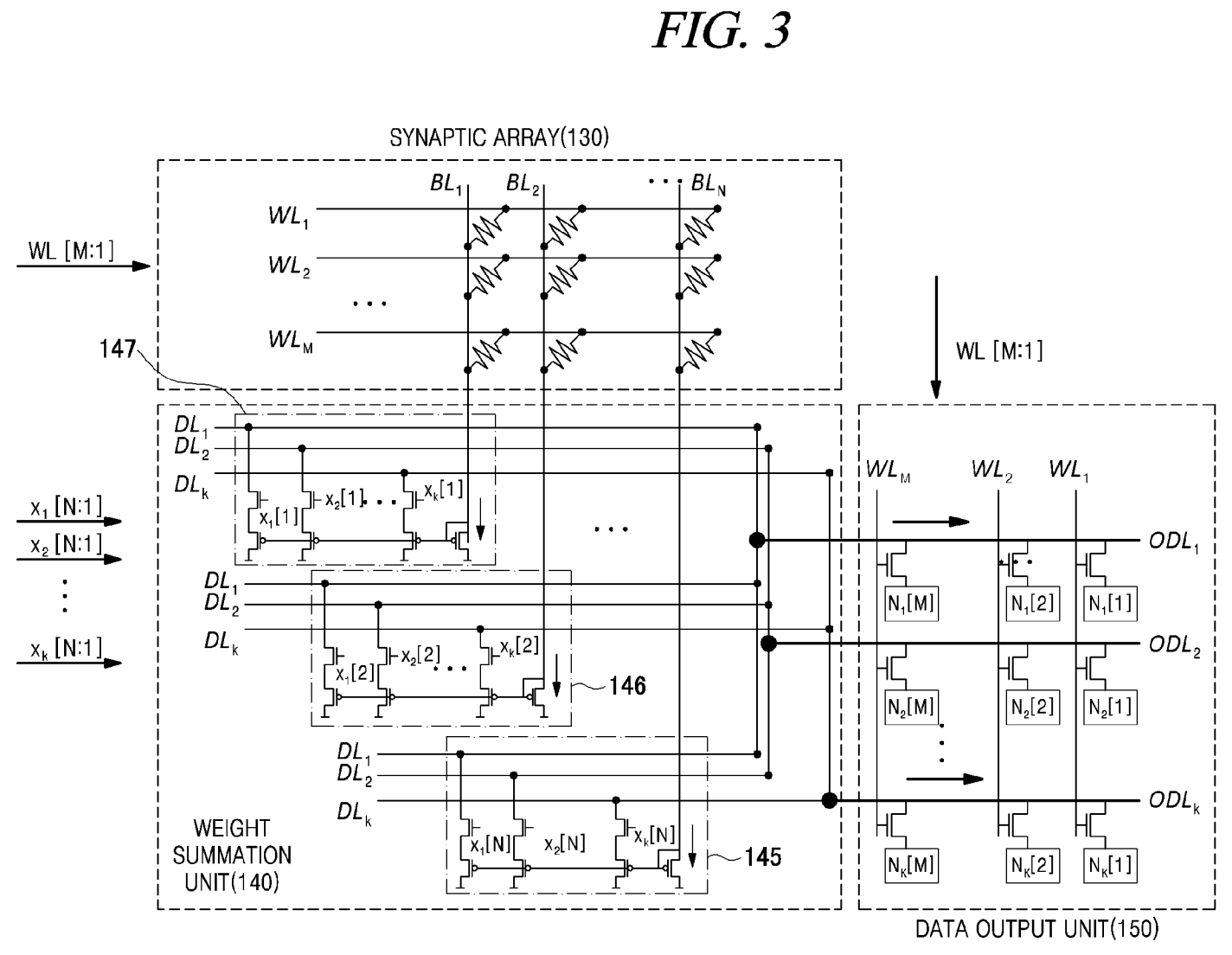

FIG. 1 is a block diagram illustrating a configuration of a neuromorphic device according to an embodiment of the present invention, FIG. 2 is a conceptual diagram illustrating a configuration of an SNN provided by a neuromorphic device, according to an embodiment of the present invention, and FIG. 3 is a circuit diagram illustrating a detailed configuration of a neuromorphic device according to an embodiment of the present invention.

As illustrated, a neuromorphic device 100 includes a synaptic array 110, a word line signal output unit 120, a signal pre-processing unit 130, a weight summation unit 140, and a data output unit 150.

As illustrated in FIG. 2, a spiking neural network using a plurality of front-end neurons, a plurality of back-end neurons, and a plurality of synaptic devices connecting the plurality of front-end neurons to the plurality of back-end neurons is implemented through the neuromorphic device 100. The neuromorphic device 100 operates to output several output spike signals together by applying weighted values stored in the synaptic array 110 in parallel to several input spike signals transmitted from the front-end neurons. Through this, inference operations for a plurality of input signals may be performed in parallel by using a learning model stored in one synaptic array 110.

The synaptic array 110 includes a plurality of word lines and a plurality of bit lines and includes a plurality of synaptic elements coupled to intersections of the respective word lines and the respective bit lines. The synaptic array 110 is implemented to perform the same function as the brain synapse and is generally implemented based on a non-volatile memory device. The synaptic array 110 corresponds to a plurality of synaptic cells, and each synaptic cell stores a predetermined weighted value. For example, the synaptic array 110 may include synaptic cells corresponding to a multiplication of the number of front-end neuronal circuits and the number of back-end neuronal circuits. As illustrated, the synaptic array may include N bit lines (N is a natural number) and M word lines (M is a natural number), the N bit lines correspond to the number of front-end neuronal circuits, and the M word lines may correspond to the number of back-end neuronal circuits.

An operation of storing weighted values for the synaptic array 110 or a process of reading the stored weighted values is performed in the same principle as a program operation or a read operation performed by a general non-volatile memory device. Here, a weighted value means a weighted value that is multiplied by an input signal in a perceptron structure representing an artificial neural network model and is additionally defined as a concept including a bias which is a special weighted value having an input of 1.

The neuronal circuits may be classified into a front-end neuronal circuit or a pre-neuronal circuit coupled to a front end of the synaptic array 110, and a back-end neuronal circuit or a post neuronal circuit coupled to a back end of the synaptic array 110. A general neuronal circuit includes a signal integrator that integrates a signal transmitted through a previous synapse or so on, and a comparator that compares an integrated signal with a threshold. In addition, when a comparison result of the comparator is greater than or equal to a threshold value, the general neuronal circuit outputs a spike signal according to an activation operation. In addition, a counter for calculating the number of spike signals may be connected to each neuronal circuit. Meanwhile, in relation to a configuration of the signal integrator, an embodiment of integrating a signal by using a capacitor is known in general.

Next, the word line signal output unit 120 sequentially outputs a plurality of word line signals for activating the respective word lines of the synaptic array 110. The word line signals are also provided to the data output unit 150 at the same timing. In this case, when the synaptic array 110 includes M word lines, the synaptic array 110 sequentially output a first word line signal to an M-th word line signal. In addition, the word line signal output unit 120 enables the first word line signal to the M-th word line signal to be sequentially outputted while pulses of an input signal output from the signal pre-processing unit 130 are maintained. Synchronization of the word line signal output unit 120 and the signal pre-processing unit 130 is maintained.

The signal pre-processing unit 130 pre-processes a spike signal received from a previous layer to modulate the spike signal into an input signal including a plurality of pulses. In particular, the signal pre-processing unit 130 causes the input signal to include N pulses which is the number of neurons or the number of bit lines in a previous stage and causes the time for each pulse to maintain a high level to be equal to a cycle in which a plurality of word line signals are sequentially output once. In addition, each pulse is maintained at the same level for the same time, but a rising time of each pulse is adjusted differently. For example, a function of the signal pre-processing unit 130 may be performed by using a sample and hold circuit.

Figure 4:
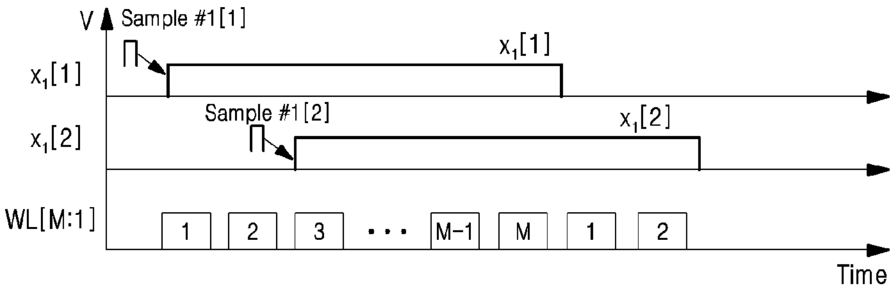
FIG. 4 is a diagram illustrating a configuration of a signal pre-processing unit and a word line signal output unit according to an embodiment of the present invention.

FIG. 4 is a diagram illustrating a configuration of a signal pre-processing unit and a word line signal output unit according to an embodiment of the present invention.

A spike signal output from a previous layer is not constant in arrival time and is also not constant in time for which the signal is maintained, and thus, the signal pre-processing unit 130 modulates the spike signal into pulses of a constant size. At least, such that weighted values of respective synaptic elements included in the synaptic array 130 may be applied, the signal pre-processing unit maintains respective pulses in a high level state while the first to M-th word line signals are sequentially output once.

In addition, an input signal includes N pulses, and the signal pre-processing unit 130 adjusts rising times of the N pulses $X_1$[1] and $X_1$[2] to be different. For example, as illustrated, an interval between the rising times of respective pulses may be set to be an interval between two word line signals, which may be changed according to a designer's choice.

Referring back to FIG. 1, the weight summation unit 140 outputs an output signal obtained by applying respective weighted values stored in the synaptic array 110 to a plurality of input signals input through the signal preprocessor 130. The weight summation unit 140 includes as many weight summation circuits 141 to 143 as the number of input signals, and through this, the weight summation unit 140 may process a plurality of input signals in parallel.

As illustrated in FIG. 3, the weight summation unit 140 has one side connected to bit lines BL1 to BLN of the synaptic array 130 and has the other side connected to the respective weight summation circuits 141 to 143 and includes a plurality of current copy circuits 145 to 147 that copy and output currents of corresponding bit lines in response to pulses of input signals. In this case, the current copy circuits 145 to 147 are arranged as many as the number of bit lines.

First, the weight summation circuits 141 to 143 are arranged as many as K, which is the number of input signals, and each of the weight summation circuits 141 to 143 includes N data lines DL arranged in parallel with each other and an output terminal ODL coupled thereto. For example, a K-th input signal includes N pulses, and the weight summation circuit to which pulses of the K-th input signal are applied includes N data lines $DL_k$ to which outputs of the current copy circuits 145 to 147 are applied and includes an output terminal $ODL_k$ coupled thereto.

The data output unit 150 transmits a plurality of output signals output by the weight summation unit 140 to a plurality of output neurons in response to each word line signal. The data output unit 150 includes a plurality of switching elements which are coupled to respective output terminals ODLs of the respective weight summation circuits and to which a plurality of word line signals are respectively applied. That is, the switching elements are each coupled to each intersection of each output terminal and each word line signal supply wire. In this case, the respective switching elements transmit output of the respective weight summation circuits to the output neuron in response to word line signals $WL_1$ to $WL_M$.

A detailed operation of the neuromorphic device of the present invention will be described by way of an example.

Figure 5:
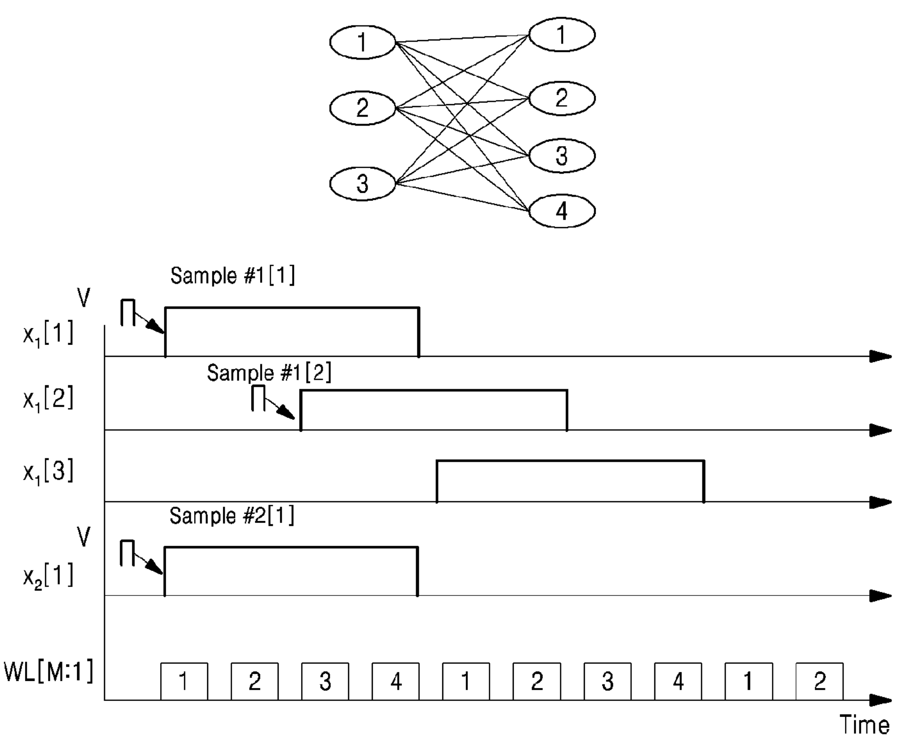
FIG. 5 is a diagram illustrating an operation of a neuromorphic device according to an embodiment of the present invention.

FIG. 5 is a diagram illustrating an operation of a neuromorphic device according to an embodiment of the present invention.

According to the illustrated SNN, it is possible to consider a synaptic array that includes a total of three front-end neurons and a total of four back-end neurons and includes 12 synaptic elements connecting the neurons to each other. According to this configuration, a synaptic array including three bit lines and four word lines is prepared. The number of input signals input to the above-described SNN is K, which may be adjusted according to a user's selection, and the present invention processes the input signals in parallel.

A first input signal $X_1$ includes pulse signals $X_1$[1], $X_1$[2], and $X_1$[3] as many as the number of front-end neurons by the signal pre-processing unit 130. In addition, the signal pre-processing unit 130 modulates a pulse signal to maintain each pulse signal in a high level state while the first to M-th word line signals $WL_1$ to $WL_4$ are activated. In addition, the respective pulse signals $X_1$[1], $X_1$[2], and $X_1$[3] included in the first input signal $X_1$ maintains an interval between two word line signals.

While the first pulse signal $X_1$[1] is maintained, the first word line signal $WL_1$ is activated, and thus, the first switching element of the current copy circuit 147 is turned on in response to the first pulse signal $X_1$[1], and a weighted value of a synaptic element connected to the first word line is transmitted to the data output unit 150 via a first bit line $BL_1$ and a data transmission line $DL_1$. In this case, the weighted value transmitted from the data transmission line DL1 is transmitted to an output neuron $N_1$[1] via a switching element (turned on in response to the first word line signal $WL_1$) coupled to the output terminal $ODL_1$ connected to the data transmission line $DL_1$.

Thereafter, the second word line signal $WL_2$ is activated, and thus, the first switching element of the current copy circuit 147 is turned on in response to the first pulse signal $X_1$[1], and a weighted value of a synaptic element connected to the second word line is transmitted to the data output unit 150 via the first bit line $BL_1$ and the data transmission line $DL_1$. In this case, the weighted value transmitted from the data transmission line $DL_1$ is transmitted to an output neuron $N_1$[2] via a switching element (turned on in response to the second word line signal $WL_2$) coupled to the output terminal $ODL_1$ connected to the data transmission line $DL_1$.

Thereafter, the third word line signal $WL_3$ is activated, and thus, the first switching element of the current copy circuit 147 and the first switching element of the current copy circuit 146 are turned on in response to the first pulse signal $X_1$[1] and the second pulse signal $X_1$[2]. Accordingly, a weighted value of a synaptic element connected to the third word line is transmitted to the data output unit 150 via the first bit line $BL_1$, the data transmission line $DL_1$, and the second bit line $BL_2$. In this way, currents transmitted through the plurality of data transmission lines may be summed and transmitted to the output neurons. In this case, the weighted value transmitted from the data transmission line $DL_1$ is transmitted to an output neuron $N_1$[3] via a switching element (turned on in response to the third word line signal $WL_3$) coupled to the output terminal $ODL_1$ connected to the data transmission line $DL_1$.

This process is repeatedly performed for a total of three pulses included in the first input signal, and while the first to fourth word line signals are sequentially output a total of two times, the processing for the first input signal is completed.

In addition, in the same manner as above, processing for the second input signal $X_2$ is performed in parallel. That is, while the first pulse signal $X_2$[1] of the second input signal $X_2$ is maintained, the first word line signal $WL_1$ is activated, and thus, the second switching element of the current copy circuit 147 is turned on in response to the first pulse signal $X_2$[1], and weighted values of each synaptic element transmitted through the first bit line $BL_1$ are transmitted to the data output unit 150 via the second data transmission line $DL_2$. In this case, the weighted value transmitted from the data transmission line $DL_2$ is transmitted to the output neuron $N_2$[1] via a switching element (turned on in response to the first word line signal $WL_1$) coupled to the output terminal $ODL_2$ connected to the second data transmission line $DL_2$.

An embodiment of the present invention may also be implemented in the form of a recording medium including instructions executable by a computer, such as a program module executed by the computer. Computer-readable media may be any available media that may be accessed by a computer and include both volatile and nonvolatile media and removable and non-removable media. In addition, the computer-readable media may include all computer storage media. The computer storage media includes both volatile and nonvolatile media and removable and non-removable media implemented by any method or technology of storing information, such as a computer readable instruction, a data structure, a program module, and other data.

Although the method and system according to the present invention are described with reference to specific embodiments, some or all of their components or operations may be implemented by using a computer system having a general-purpose hardware architecture.

The above descriptions on the present invention are for illustration, and those skilled in the art to which the present invention pertains may understand that the descriptions may be easily modified into other specific forms without changing the technical idea or essential features of the present invention. Therefore, it should be understood that the embodiments described above are illustrative in all respects and not restrictive. For example, each component described as a single type may be implemented in a dispersed form, and likewise components described as distributed may be implemented in a combined form.

The scope of the present invention is indicated by the following claims rather than the above detailed description, and all changes or modifications derived from the meaning and scope of the claims and their equivalents should be interpreted as being included in the scope of the present invention.

REFERENCE SIGNS LIST

100: neuromorphic device
110: synaptic array
120: word line signal output unit
130: signal pre-processing unit
140: weight summation unit
150: data output unit

The invention claimed is:

1. A neuromorphic device comprising:

a synaptic array including a plurality of word lines and a plurality of bit lines and including a plurality of synaptic elements coupled to intersections of each of the plurality of word lines and each of the plurality of bit lines;

a word line signal output unit that sequentially outputs a plurality of word line signals for activating the plurality of word lines;

a signal pre-processing unit that preprocesses a spike signal to modulate the spike signal into an input signal including a plurality of pulses;

a weight summation unit including a plurality of weight summation circuits that respectively output a plurality of output signals obtained by applying respective weighted values stored in the synaptic array to a plurality of input signals input through the signal pre-processing unit; and a data output unit that transmits the plurality of output signals output by the weight summation unit respectively to a plurality of output neurons in response to the plurality of word line signals.

2. The neuromorphic device of claim 1, wherein the signal pre-processing unit performs modulation such that a time during which the plurality of pulses each maintain a high level is equal to a cycle in which the plurality of word line signals are sequentially output once.

3. The neuromorphic device of claim 1, wherein the weight summation unit has one side connected to bit lines of the synaptic array and has another side connected to the plurality of weight summation circuits and includes a plurality of current copy circuits that copy and output currents of corresponding bit lines in response to the plurality of input signals.

4. The neuromorphic device of claim 3, wherein the data output unit includes a plurality of switching elements which are coupled to a plurality of output terminals of the plurality of weight summation circuits and to which the plurality of word line signals are respectively applied, and the plurality of switching elements transmit outputs of the plurality of weight summation circuits to the plurality of output neurons in response to the plurality of word line signals.

5. The neuromorphic device of claim 4, wherein while a first word line signal to an M-th word line signal (M is a natural number) are sequentially output, weighted values stored in the plurality of synaptic elements connected to the plurality of word lines of the synaptic array are sequentially transmitted to the weight summation unit through the plurality of bit lines, the weight summation unit outputs values obtained by copying currents of the plurality of bit lines to the plurality of output terminals of the plurality of weight summation circuits in response to a first pulse signal to an N-th pulse signal (N is a natural number) included in a first input signal to a K-th input signal (K is a natural number) through the plurality of weight summation circuits, and the data output unit transmits the values output from the plurality of output terminals of the plurality of weight summation circuits to the plurality of output neurons through the plurality of switching elements operating in response to the first word line signal to the M-th word line signal.

6. The neuromorphic device of claim 5, wherein the synaptic array includes M word lines and N bit lines, the word line signal output unit outputs M word line signals, the spike signal pre-processing unit outputs K input signals, each including N pulses, the weight summation unit includes K weight summation circuits that respectively process the K input signals in parallel, and the data output unit includes a plurality of switching elements that operate in response to the M word line signal, and M switching elements are coupled to output terminals of K weight summation circuits.

7. A neuromorphic device comprising:

a synaptic array including M word lines (M is a natural number) and N bit lines (N is a natural number) and including a plurality of synaptic elements coupled to intersections of each of the plurality of word lines and each of the plurality of bit lines, wherein the M word lines are sequentially activated by M word line signals;

a weight summation unit including K weight summation circuits that output respectively output signals obtained by applying respective weighted values stored in the synaptic array to K input signals, each input signal including a plurality of pulses; and a data output unit that transmits the K output signals output from the weight summation unit respectively to output neurons for each pulse included in the K input signals in response to the M word line signals, wherein each of the K input signals includes N pulses.

8. The neuromorphic device of claim 7, further comprising:

a word line signal output unit that sequentially outputs the M word line signals for activating the M word lines; and a signal pre-processing unit that preprocesses a spike signal to modulate the spike signal into an input signal of the K input signals including N pulses, wherein the signal pre-processing unit performs modulation such that a time during which the plurality of pulses each maintain a high level is equal to a cycle in which the plurality of word line signals are sequentially output once.

9. The neuromorphic device of claim 7, wherein the weight summation unit has one side connected to bit lines of the synaptic array and has another side connected to the plurality of weight summation circuits and includes N current copy circuits that copy and output currents of corresponding bit lines in response to the plurality of input signals.

10. The neuromorphic device of claim 9, wherein the data output unit includes a plurality of switching elements which are coupled to a plurality of output terminals of the plurality of weight summation circuits and to which the M word line signals are respectively applied, and the plurality of switching elements transmit outputs of the plurality of weight summation circuits to the plurality of output neurons in response to the plurality of word line signals.

11. The neuromorphic device of claim 10, wherein while a first word line signal to an M-th word line signal (M is a natural number) are sequentially output, weighted values stored in the plurality of synaptic elements connected to the plurality of word lines of the synaptic array are sequentially transmitted to the weight summation unit through the plurality of bit lines, the weight summation unit outputs values obtained by copying currents of the plurality of bit lines to the plurality of output terminals of the plurality of weight summation circuits in response to a first pulse signal to an N-th pulse signal included in a first input signal of the K input signals to a K-th input signal of the K input signals through the plurality of weight summation circuits, and the data output unit transmits the values output from the plurality of output terminals of the plurality of weight summation circuits to the plurality of output neurons through the plurality of switching elements operating in response to the first word line signal to the M-th word line signal.

* * * * *